April 30, 1963 G. M. ANDERSON ET AL 3,087,991

SUPERVISORY SYSTEM

Filed April 18, 1960 2 Sheets-Sheet 1

INVENTORS
GEORGE M. ANDERSON
STEFAN SWIETLUK
BY WILLIAM G. WHITNEY

George H. Fritzinger
AGENT

INVENTORS
GEORGE M. ANDERSON
STEFAN SWIETLUK
BY WILLIAM G. WHITNEY
George H. Fritzinger
AGENT 3,087,991
Patented Apr. 30, 1963

1

3,087,991

SUPERVISORY SYSTEM

George M. Anderson, Whippany, Stefan Swietluk, Jersey City, and William G. Whitney, Pines Lake, N.J., assignors to McGraw-Edison Company, Elgin, Ill., a corporation of Delaware Filed Apr. 18, 1960, Ser. No. 22,955
15 Claims. (Cl. 179—5)

This invention relates to supervisory systems for reporting fault and/or alarm conditions over telephone lines from unattended substations to a supervisory station. The system is adapted also for interrogating the substations from the supervisory station at any time simply by the supervisor dialing the number of the particular substation and hanging up his recever to await the incoming message from the substation.

An object of the invention is to provide an improved supervisory system which will report automatically whenever a fault or alarm condition arises.

Another object is to provide such supervisory system wherein the substation will keep calling the supervisor's station at regular intervals, once there occurs the condition being monitored, until a calling connection is made with the supervisor's station and a message is reported thereto.

Another object is to provide such supervisory system with a single transmission means adapted to cause only one message to be reported to the supervisor's station for each fault or alarm condition that arises regardless of how long the condition remains.

Another object is to provide such supervisory system which when an alarm or fault condition develops, whether only momentarily or not, will continue making calling attempts until a connection has been made with the supervisor's station and the message is reported thereto.

A further object is to provide such supervisory system wherein in response to a call by the supervisor the substation will thereupon report automatically the state of the condition being monitored including whether or not a fault or alarm condition still remains which may have been reported earlier by the substation.

Another object is to provide such supervisory system with means to produce a permanent record of each message reported to the supervisor's station.

Another object is to provide such supervisory system wherein when a fault or alarm condition arises the substation will call the supervisor's station at regular intervals for a predetermined number of times or until connection is made, then pause for a preset longer interval if no connection has yet been made, and then repeat the foregoing cycle or portion thereof until a calling connection is made.

A further object is to provide such supervisory system with manually resettable means at the supervisor's station to apprise whenever a message has been received.

The present supervisory system comprises a supervisor's station and a plurality of substations each with equipment to be monitored, with connections between the supervisor's station and the substations over regular telephone lines. When an alarm or fault condition arises at a substation a memory equipment is activated until a message is reported to the supervisor's station and the substation is reset. In reporting the message the substation seizes the outgoing telephone line the instant the alarm or fault condition occurs and waits a short interval for dial tone, after which it dials the number of the supervisor's station. Ringing current fed to the supervisor's station sets automatic control equipment into operation causing the supervisor station equipment to "answer" the call without need for the supervisor to pick up the receiver. An incident of answering the call is the feeding out from the supervisor's station of an interrogation signal to the substation. If for any reason this interrogation signal is not received by the substation the latter "hangs up" in effect and awaits a predetermined interval to make another calling attempt. Once the interrogation signal is received the substation proceeds ahead to feed out a coded signal according to the condition being monitored, which is received and printed out as a message identifying the substation and apprising as to the condition of the substation. Only one message is reported for each alarm or warning condition and such message is reported regardless of how long the alarm warning or fault condition exists and how long it may take for the substation to make connection with the supervisor's station. At any time any substation may be called by the supervisor and a message will be reported back as to the conditions being monitored at the particular substation. Furthermore, such message will apprise whether an alarm condition reported at an earlier time still exists.

2

Other objects and features of the invention will be apparent from the following description and the appended claims.

In the description of the invention reference is had to the accompanying drawings, of which:

Figure 1:
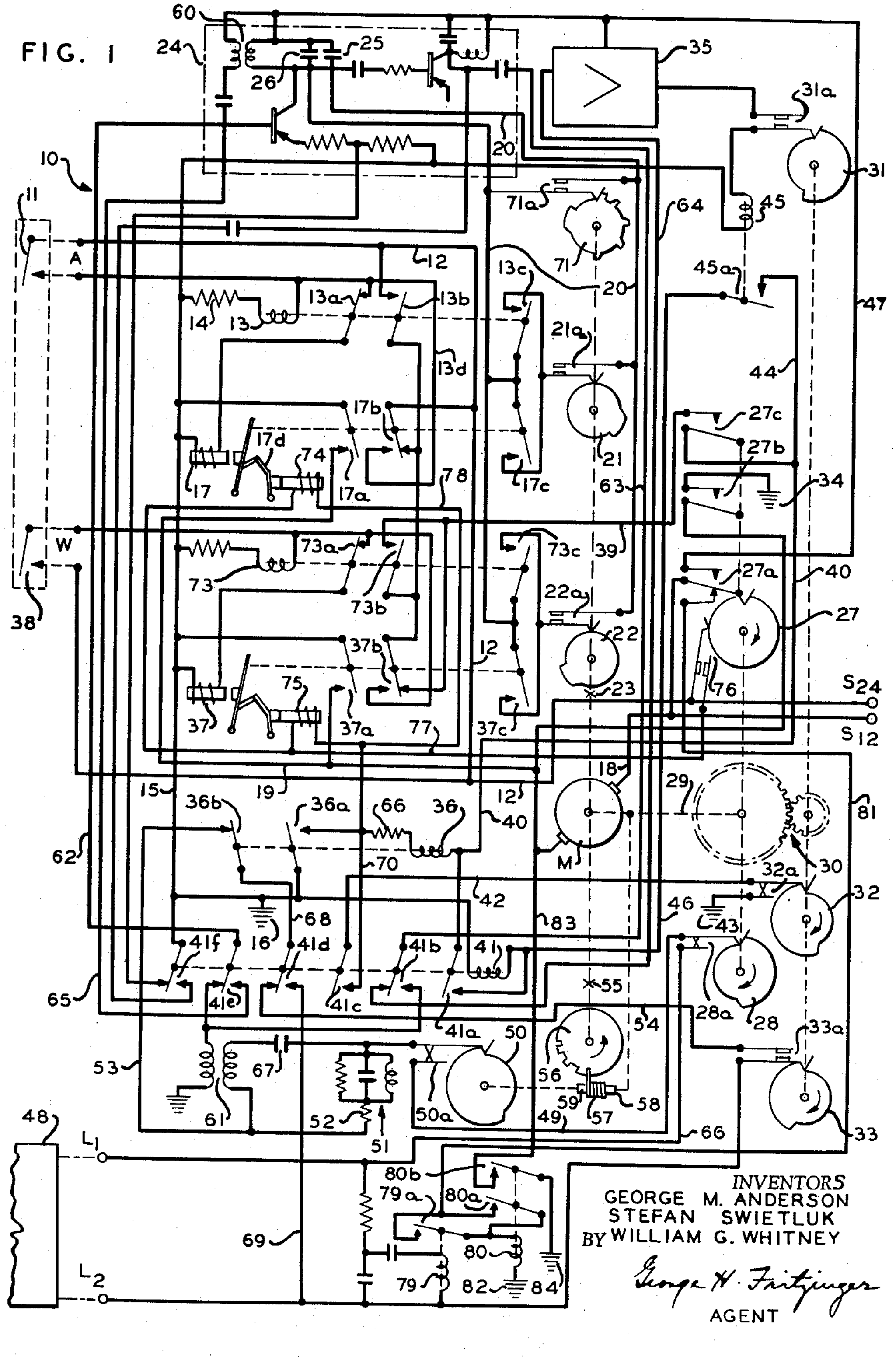
FIGURE 1 is a schematic diagram of the equipment of one of the substations.

With reference to FIGURE 1, showing the particular apparatus of a substation 10, there is a switch 11 operable by suitable means not shown to detect when an alarm condition develops, such switch being for example thermally operated as when temperature conditions are being monitored. Upon closure of the detector switch 11 current flows from the battery source S24 designating a D.C. source of 24 volts, through lead wire 12, detector switch 11, switch 13*a*, alarm relay 17 and lead 15 to ground 16, causing alarm relay to operate and to be latched by a latching bar 17*d*. Also, the instant the detector switch 11 is closed current flows from the source S24 through the detector switch 11, memory relay 13, resistor 14, lead 15 and ground 16, but memory relay 13 is a slow acting one and is not operated until 100 milliseconds after the alarm relay 17. Operation of the alarm relay 17 provides a circuit paralleling the detector switch 11 to keep the memory relay operated until the last of the following occurs: the detector switch 11 is restored or the latched relay 17 is reset. The circuit paralleling the detector switch is via the lead 13*d* and the switch 17*b* left contact. Operation of the alarm relay 17 closes contact 17*a* to start the motor M from a 12 volt D.C. source S12 through lead wire 18, motor M, lead wire 19, contact 17*a* and lead wire 15 to ground 16. Operation of the memory relay 13 opens the contact 13*a* removing operating current from the alarm relay 17 but without affecting the alarm relay because of it being already latched. The alarm and memory relays 17 and 13 also close the switches 17*c* and 13*c* respectively. The switches 17*c* and 13*c* are connected in parallel in a tuning circuit 20 to prepare this circuit so it will be later activated upon closure of a coding switch 21*a* controlled by a cam 21 driven by the motor M through an intermittent coupling diagrammatically represented at 23 in FIGURE 1. The tuning circuit 20 is connected to an oscillator-amplifier 24 and serves to connect a condenser 25 in parallel with a condenser 26 of the oscillator circuit to reduce its frequency from about 1955 c.p.s. to 1615 c.p.s. As will later appear, the tuning circuit 20 has two additional branches paralleling the branch through the contacts 13*c*, 17*c* and 21*a* just described, each of which when closed effects also the tuning change just mentioned.

The motor M has a permanent drive connection 29, diagrammatically represented, with the cams 27 and 28 to drive these cams at a speed of one revolution every nine minutes. As will appear, each time the motor M is started the apparatus at the substation goes through one complete series of operations over a period of nine minutes determined by the cam 27. Through gear reduction 30 the motor drives also cams 31, 32 and 33 at a reduced speed of one full revolution every one and one half minutes. Cam 27 has a single peripheral notch engaged by a switch actuator arm and causing switches 27*a*, 27*b* and 27*c* to be operated about one second after the motor is started and to be held operated until the cam completes its nine minute revolution. Switch 27*b* completes a second ground connection at 34 for the motor M paralleling the ground connection 16 through contacts 17*a* already described. Switch 27*a* completes connection of sources S12 through lead 47 to collector electrodes of the transistors of oscillator-amplifier 24 and of an output amplifier 35. Switch 27*c* prepares a circuit from source S24 for a single transmission relay 36 the function of which is to limit the apparatus to feed out one message only within the nine minute cycle, the circuit so prepared for the relay 36 running through lead 12, contacts 13*b* of relay 13 contacts 37*b* at its right side of a warning relay 37 (which has the same function with respect to a pair of warning signal contacts 38 at the substation 10 which the relay 17 has with respect to the alarm contacts 11) lead 39, contacts 27*c* and lead 40 to the relay 36. This prepared circuit is later completed through contacts 41*c* of relay 41, lead 42 and contacts 32*a* to ground 43 and is held completed through contacts 36*a* of relay 36. The relay 41 is herein called an "interrogation" relay since its operation depends upon receipt of a so-called "interrogation" signal received from the supervisor station, as will appear. Still further, there is a branch circuit leading from the preparatory circuit just described starting at a point beyond the switch 27*c* through lead 44, switch 45*a* of relay 45 connected to the output of amplifier 35, lead 46 and coil of the interrogate relay 41 to ground 16. This last branch circuit is the one which initiates operation of the interrogate relay when an interrogate signal is received from the supervisory station (FIGURE 2) through conventional automatic switchboard generally indicated by block 48, but such interrogate signal is not received until the supervisory station has been called by the sequence of events now next described.

About four seconds after the motor M is started the cam 33 operates switch 33*a* to complete a D.C. circuit across the telephone line $L_1L_2$ through a dial pulse switch 50*a* at the substation, the circuit being via lead 66, switch 28*a* (now being held closed for the first 4.5 minutes of the nine minute cycle) lead 49, the dial pulse switch 50*a* operable by dial cam 50, choke coil of Lc circuit 51, resistance 52, lead 53, switch 36*b*, switch 41*d* at its left contact, lead 54, and switch 33*a*. This connection across the telephone line $L_1L_2$ is equivalent in the usual telephone circuit of picking up the receiver. Cam 33 holds the switch 33*a* closed for an interval of 35 seconds' time to provide an interval of this duration for dialing the supervisor's station.

About ten seconds after the motor M is started an intermittent coupling 55 is completed between the motor and a notched disk 56, starting rotation of the disk. This is a dialing disk engaged slidably by a projecting end of a one-way clutch spring 57. As the notches of the disk pass the end of the clutch spring the latter is freed to couple a shaft 58 of the motor M to the shaft 59 of the dialing cam 50. The dialing cam actuates the dial pulse switch 50*a* to send dialing pulses out on the line $L_1L_2$ to call the supervisor's station. The dialing is completed in about twenty seconds allowing therefore about nine seconds time for the substation to receive the interrogate signal provided a calling connection has been made. In order that the apparatus may respond to receipt of such interrogate signal, the cam 31 closes switch 31*a* about one second after the dialing of the supervisor's station is completed. Closure of switch 31a completes connection of relay 45 to the output of the amplifier 35 via ground 16.

If a call connection has been made from the substation to the supervisor's station and the interrogate signal has been received within the 35 second dialing period determined by cam 33, the interrogate signal is received by the oscillator-amplifier 24 now operating as an amplifier because the primary winding of the oscillator transformer 60 is now open at the right contact of switch 41*e*, the connection from the line $L_1L_2$ to the amplifier 24 being through lead 66, switch 28*a*, dial switch 50*a*, audio transformer 61, switch 41e at its left contact and line 62. Amplifier 24 is now connected to output amplifier 35 through line 63, switch 41*b* at its left contact and line 64. Output amplifier 35 is connected to relay 45 to close the switch 45*a* by the interrogate signal received from the supervisor's station. As before described, closure of switch 45*a* completes a previously prepared circuit (via lead 12, switch 13*b*, switch 37*b* right contact, lead 39, switch 27*c*) to connect source S24 across interrogate relay 41 through line 46, relay 41 and ground 16. The instant interrogate relay 41 is operated it receives a holding circuit through lead 40 and switch 41*a* to keep the relay operated after the interrogate signal ceases and the relay 45 drops out.

Operation of the interrogate relay 41 connects line 62 to line 65 thereby connecting primary of oscillator transformer 60 in circuit and converting the first stage of unit 24 to operate as an oscillator. Also, it disconnects the output of the oscillator from the amplifier 35 at 41*b* left contact and connects the oscillator 24 to the left winding of audio transformer 61 at 41*b* right contact. The right winding of the audio transformer is now connected across the line $L_1L_2$ through line 66, switch 28*a*, line 49, switch 50*a*, condenser 67, right winding transformer 61, line 53, switch 36*b*, line 68, switch 41*d* right contact and line 69. Thus in response to receipt of the interrogate signal from the supervisor's station 48 within the 35 second dialing period, the amplifier 24 is converted to an oscillator and is connected back through the line $L_1L_2$ to the supervisor's station. Moreover, this connection is no longer dependent upon the cam switch 33*a* since it is now made through a switch of the interrogate relay. This circuit connection of the oscillator with the supervisor's station is preserved for 25 seconds after the cam switch 33*a* opens—i.e., until 64 seconds has elapsed from the start of the motor M. At the end of this 64 second period the cam switch 32*a* is reclosed to operate the single transmission relay 36 from line 40 (now connected to source S24 as before described) through coil of relay 36, resistor 66, line 70, switch 41*c*, line 42 and switch 32*a* to ground 43. Once the single transmission relay 36 is operated it receives a holding circuit through contacts 36*a* which keeps the relay operated until the end of the nine minute cycle. However, in the twenty-five second interval just preceding operation of the single transmission relay 36 the apparatus generates the coded message identifying the substation and apprising as to its condition, and feeds this message out on the line $L_1L_2$ to the supervisor's station where it is printed in readable form. This coded message is generated by the cams 21, 22 and 71 intermittently altering the oscillator frequency as is next described.

About one second after the switch 33*a* is opened—i.e., about 40 seconds from the time the motor was started—the cams 21, 22 and 71 are started by the motor M through the intermittent coupling 23 to drive these cams through one complete revolution over the ensuing twenty second time interval. Cam 71 is notched to close and open the switch 71*a* to change the oscillator frequency between 1955 c.p.s. and 1615 c.p.s. whereby to produce coded signals which will identify the particular substation. Cam 21 is notched to close and open the switch 21*a* according to a predetermined code identifying whether an alarm condition has arisen at substation 10. Cam 22 is notched to close and open switch 22*a* according to a predetermined code identifying whether a warning condition has arisen at the substation.

As already described, closure of switch 11 responsive to an alarm condition causes the alarm relay 17 to be activated followed 100 milliseconds later by activation of the relay 13. Among the other functions already described, operation of these relays close respectively the switches 17*c* and 13*c* in the branch of the tuning circuit in series with the cam operated switch 21*a*. Operation of this cam starting one second after the beginning of the twenty-five second signalling period begins generation of the coded signal which will apprise the supervisor as to the alarm condition at the substation. Similarly, were a warning condition to develop closing the switch 38 the warning relay 37 would be operated followed 100 milliseconds later by operation of the relay 73 in the manner as already described with respect to the relays 17 and 13, and these operations among other functions would close the switches 37*c* and 73*c* in the branch of the tuning circuit in series with the cam operable switch 22*a*.

Figure 3:
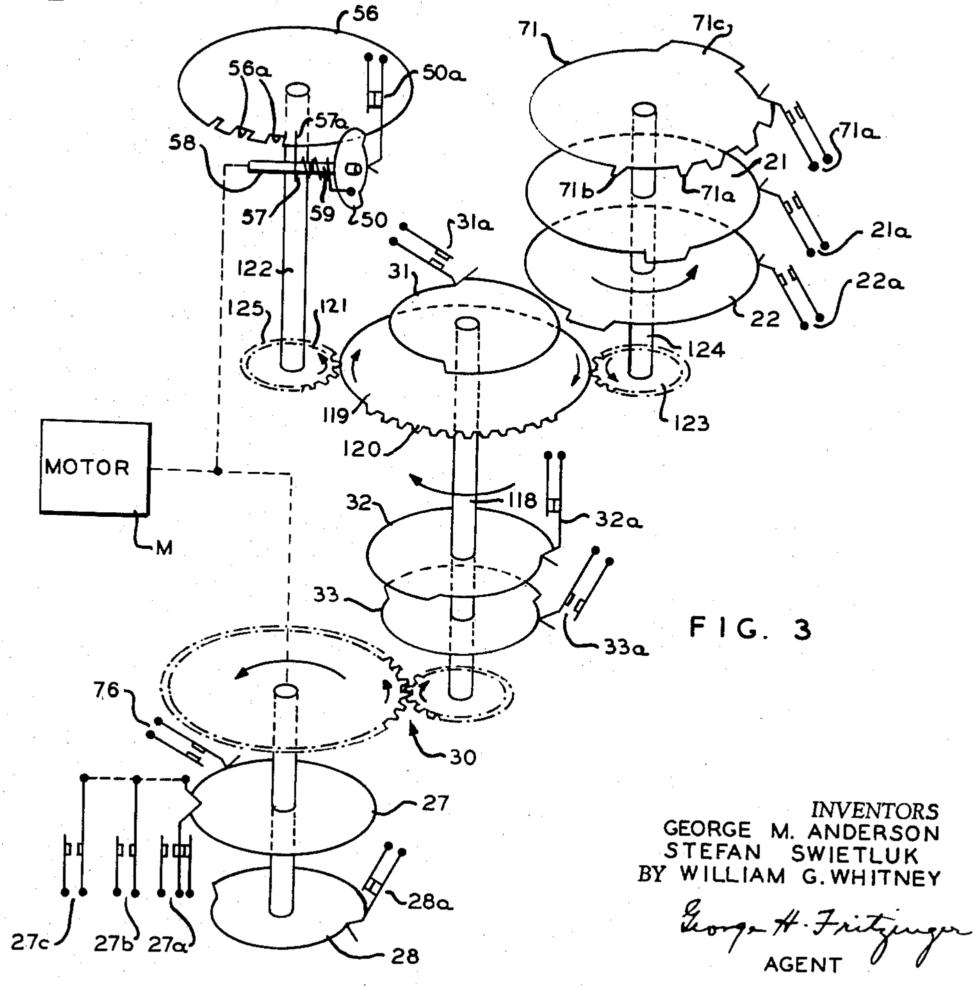
FIGURE 3 is a diagrammatic layout of the drive and timing mechanism of the equipment of one of the substations.

The station identifying cam 71, alarm-condition identifying cam 21 and the warning-condition identifying cam 22 may for example operate according to the following code: reduction of the oscillator frequency from 1955 cycles to 1615 cycles for 200 milliseconds prints a dash mark, for 400 milliseconds prints a number 1, for 600 milliseconds prints a number 2, for 800 milliseconds prints a number 3, for 1000 milliseconds prints letter A indicating "alarm," for 1200 milliseconds prints a letter W indicating "warning" and for 1500 milliseconds prints a symbol indicating "switching off." Each substation may be identified by numbers only. For example, a complete message may comprise three numbers identifying the substation followed by a pair of dash signals when there is neither alarm nor warning conditions present, or by a letter "A" in place of the first dash signal if an alarm condition is present and/or by a letter "W" in the place of the second dash if a warning condition is present. Thus, if the substation 10 is identified by the numbers 321, and an alarm condition is present the apparatus would print the message 321A—. If only a warning condition were present the apparatus would print 321—W and if both alarm and warning conditions are present it would print 321AW. With reference to FIGURE 3, dash indications are provided by projections 71*a* and 71*b* of cam 71 and "switching off" by projection 71*c* of cam 71.

At sixty seconds from the time the motor was started the cams will have completed their revolution to generate the coded message sent out by the oscillator on the telephone line to the supervisor's station. When four seconds later the cam 32 recloses the switch 32*a* to energize the single transmission relay 36 as before described, this relay breaks the line connection with the supervisor's station at the contacts 36*b*, and since the relay is held operated until the end of the nine minute cycle it prevents sending out any further messages within the nine minute time interval.

Just prior to the cam 27 completing its nine minute revolution it momentarily closes a pair of contacts 76 to provide operate current to the reset coil 74 from the source S24 through switch 76, line 77, reset coil 74, line 78, switch 36*a* of single transmission relay 36 and ground 16. Energization of the reset coil 74 removes the latch

17*d* from the alarm relay to cause the same to return to unoperated position. The reset coil 75 of the warning relay 37 is also energized at the same time but unless a warning condition has developed causing activation of the warning relay this energization of the reset coil 75 has no effect. Return of the alarm relay 17 removes one ground connection of the motor circuit at 17*a*, leaving still however a second ground connection for the motor through switch 27*b* to ground 34. It also opens the switch 17*c* but without any immediate effect. It also returns the switch 17*b* to its right contact dropping out the slow relay 13 assuming that the condition responsive switch 11 opened before the expiration of the nine minute period. The drop-out of relay 13 closes switch 13*a* without immediate effect and opens switches 13*b* and 13*c* also without immediate effect. The drop-out of both relays 13 and 17 removes the preparatory circuit for the cam switch 21*a*.

When cam 27 reaches its home position it returns switches 27*a*, 27*b* and 27*c*. When switch 27*b* is returned, the last ground connection for the motor M is removed causing the motor to stop. When switch 27*a* returns it breaks power to the oscillator 24 and amplifier 35. When switch 27*c* returns it breaks power to the interrogate relay 41 and signal transmission relay 36 to drop out these relays. This restores the substation apparatus to its initial condition.

If the supervisor at the supervisor's station dials the substation 10 and completes connection thereto through the line $L_1L_2$ ringing current will be provided to activate the relay 79. When the supervisor hears the ringing current in his receiver he is to hang it up because the substation takes over the function of calling the supervisor's station in the same manner as when an alarm or warning condition arises, the sequence of events being the dialing of the supervisor's station by the cam 50, receiving the interrogate signal from the supervisor's station if connection is made thereto, operation of the interrogate relay 41 by the interrogate signal, the generating and sending out of the coded message on the line $L_1L_2$ to the printing mechanism at the supervisor's station, operation of the signal transmission relay 36 by the closing of cam switch 32*a* at the end of the coded message to disconnect the substation from the line $L_1L_2$ and subsequently restoring the substation to its initial condition by return of the cam 27 to home position. The actuation of the relay 79 by the ringing current closes switch 79*a* and causes relay 80 to be activated from source S12 through switch 27*a* lower contact, line 81, switch 79*a*, relay 80 and ground 82. Closure of switch 80*a* provides a holding circuit for the relay 80 until the switch 27*a* is subsequently opened at its lower contact. Relay 80 also closes switch 80*b* to start the motor M through the circuit running from source S12, motor M, lead 83, switch 80*b* and ground 84. Start of motor M causes cam 27 to operate switches 27*a*, 27*b* and 27*c* to begin the cycle of operations by which the substation dials the supervisor's station, receives the interrogate signal if connection is made to the supervisor's station, and generates and feeds out the coded message to the supervisor's station. However, operation of switch 27*a* has now an additional function in that as it breaks its lower contact it drops out the relay 80 to remove the ground connection 84 by which the motor was first started, it being understood that the motor is kept running however by the switch 27*b* completing the motor circuit to ground 34. If there is neither any alarm or warning condition existing at the substation when the supervisor calls, the tuning circuit 20 is controlled only by the cam 71 to cause the coded message to produce the identifying signal for the substation followed by two dash signals. If an alarm and/or warning condition exists when the supervisor calls, then the coded message will comprise the identifying number of the substation plus the letter A and/or letter W. As before described the letters A and/or W will be so printed because when switches 11 and/or 38 are closed at the substation at least the corresponding relays 13 and/or 73 are activated closing switches 13*c* and/or 73*c* to prepare the branches of the tuning circuit for control by the cam switches 21*a* and/or 22*a*.

If a calling attempt is made either by the supervisor dialing the substation or by an alarm or warning condition developing at the substation, and a correct connection is not made because the telephone line $L_1L_2$ is busy or because a wrong connection is made for any reason, there will not be received an interrogate signal at the substation with the result that the cam 33 in 39 seconds from the start of the motor M will open the line $L_1L_2$ at switch 33*a* because the interrogate relay is not now operated. This opening of the line occurs before any coded message is generated and sent out. In one and one-half minutes from the initial start of the motor the substation will attempt again to complete a connection with the supervisor's station by reason of the cams 33, 32 and 31 starting through a second revolution of movement. As before, about ten seconds after the start of the cams through the second revolution the dialing disk 56 becomes temporarily coupled with the motor M to dial the supervisor's station. If again a correct connection is not made, the supervisor's station will be disconnected from the telephone line in 39 seconds of the second one and one-half minute cycle and the apparatus will rest until this second one and one-half minute cycle is completed. Thereupon, a third calling attempt is started as the cams 33, 32 and 31 begin their third revolution of movement. If the third calling attempt also fails, the system is placed in a disabled condition for an ensuing 4.5 minutes by reason of the cam 28 holding the switch 28*a* open during the last half of each nine minute revolution of the cams 27 and 28.

If the calling attempt described in the foregoing paragraph was by the supervisor and the supervisor failed to make connection with the substation, the motor M is stopped at the end of the nine minute cycle by the opening of the switch 27*b* when the cam 27 completes its full nine minute revolution. On the other hand, if it was a calling attempt by the substation because of an alarm or warning condition closing the switches 11 or 38, and the calling attempt failed, the single transmission relay 36 will not have been operated at the end of the nine minute cycle with the result that the reset coils 74 and 75 will not be operated when the switch 76 is momentarily closed since the reset coils do not now have a prepared circuit connection through the switch 36*a* to ground 16. Accordingly, the relays 13 and 17 will stay operated if there has been an alarm condition, and the relays 73 and 37 will stay operated if there has been a warning condition to cause the motor M to run continuously through into a succeeding nine minute cycle. These nine minute cycles will continue to repeat until an interrogate signal is received from the supervisor's station.

If an alarm or warning condition has occurred at the substation and a completed connection has been made with the supervisor's station printing there the coded message, and this alarm and/or warning condition still exists at the end of the nine minute cycle, the alarm and/or warning relays 17 and 37 will have been dropped out at the instant the switch 76 was closed because of the single transmission relay having been operated, but the relays 13 and/or 73 will remain operated. The dropping out of relays 17 and/or 37 will stop the motor M by the opening of switch 27*b* when the cam 27 completes its nine minute revolution. The motor M is not now restarted because it is required that the relays 17 and/or 37 be operated in advance of its associated relays 13 and/or 73 to start the motor. But if it is only one of the switches 11 and 38 which remains still closed at the end of the nine minute cycle, and either of the other of these switches is subsequently closed or the supervisor calls the substation, the motor is started in the normal manner to produce the coded message and cause the same to be fed to the printer at the supervisor's station. In the printing operation it will record the fact that one of the switches 11 or 38 has remained closed because the switch 13*c* or 73*c* has remained closed leaving the tuning circuit 20 prepared to develop the coded signal apprising of that fact when the motor starts the coding cams 21 and 22.

If both alarm and warning conditions have remained continuously after the nine minute cycle during which the substation sent out the coded message to the supervisor station, and subsequently the supervisor calls the substation while both switches 11 and 38 remain still closed, the coded message printed at the supervisor's station responsive to the supervisor's call will record that both alarm and warning conditions still exist.

If the alarm or warning condition has arisen causing either switch 11 or 38 to close, and if a call connection has been made with the supervisor's station and an interrogation signal received therefrom operating the interrogate relay 41, but a second condition then develops operating the other of the switches 11 and 38, that second switch operation will drop out the interrogate relay 41, as well as the single transmission relay 36 if the preceding call had been completed, and will start anew the operation of sending through a coded message in the regular way either at the start of the next succeeding one and one-half minute cycle or at the end of the four and one-half minute idle period of the nine minute cycle, in the latter instance starting anew another nine minute cycle. This is because when the interrogate relay is first operated responsive to the switch 11 being closed it is from source S24 through line 12, switch 13*b*, switch 37*b* right contact, line 39, switch 27*c*, switch 45*a*, line 46, relay coil 41 and ground 16. If the switch 38 now is closed, relay 37 is operated from source S24 through switch 38, switch 73*a* and ground, opening switch 37*b* at its right contact to drop out the interrogate relay 41 and also the single transmission relay 36 if operated, and closing switch 37*b* at its left contact to provide power to relay 73, causing relay 73 to pull in 100 milliseconds after relay 37 is operated. Closure of the switch 73*b* now prepares circuit to relay 41 from source S24 through line 12, switch 38, switch 37*b* left contact, switch 73*b*, line 39, switch 27*c*, switch 45*a* and line 46, and to relay 36 from switch 27*c* through line 40. Interrogate relay 41 is operated from line 46 to ground 16 and relay 36 is operated from switch 27*c* through line 40, coil 36, switch 41*c*, line 42 and switch 32*a* to ground 34. However, operation of interrogate relay 41 does not now occur until the interrogate signal is fed through the amplifier 35 to operate the relay 45 and close switch 45*a*. Following operation of the interrogate relay, the motor M drives the coding cams 21, 22 and 71 to produce the coded signals from the oscillator 24 which when fed out into the line $L_1L_2$ will operate the printer at the supervisor's station to identify the substation and to apprise that both alarm and warning conditions exist.

Figure 2:
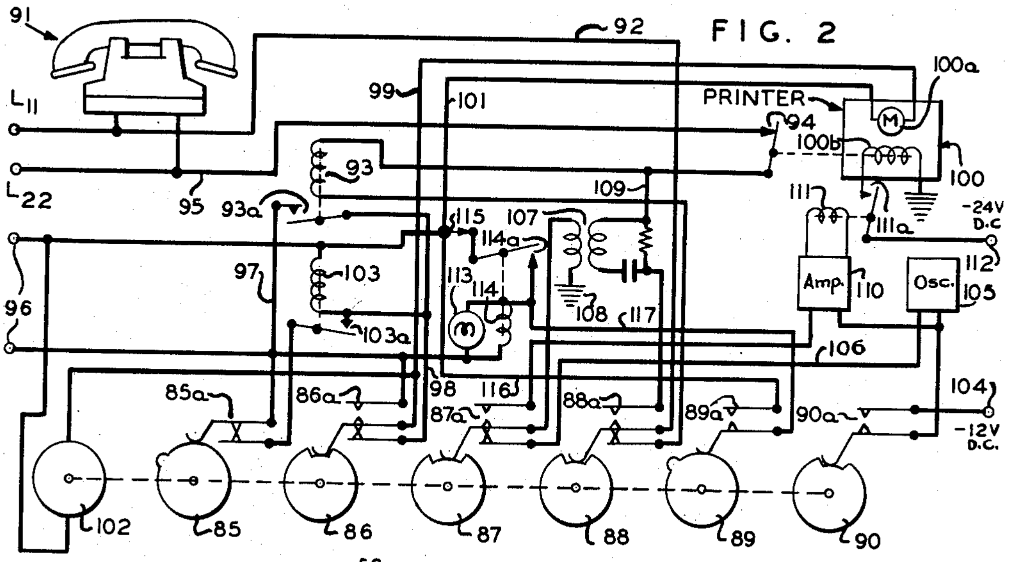
FIGURE 2 is a schematic diagram partly in block form of the equipment at a supervisor's station.

The apparatus of the supervisor's station shown in FIGURE 2 is connected with the telephone line $L_{11}L_{22}$. When dial pulse signals are fed out from a substation on the telephone line $L_1L_2$ a connection is made by the conventional automatic switch board 48 to the supervisor's telephone line $L_{11}L_{22}$ and ringing current is fed from the switchboard apparatus to the supervisor's station. The ringing current operates the ringer in the standard telephone box 91 and operates also a ringing circuit relay 93 via lead line 92, cam switch 88*a* lower contact, coil of the relay 93, switch 94 and lead line 95. Operation of the ringer relay 93 closes switch 93*a* to supply operating current from a 115 volt source 96 through lead line 97, switch 93*a*, lead line 98, cam switch 86*a* lower contact, lead line 99, motor 100*a* of a printing mechanism 100 and lead line 101. Also, power is supplied from the source 96 through switch 93*a* and cam switch 86*a* lower contact to motor 102 to start driving the cams 85–90 in a clockwise direction. Still further, power is supplied from the source 96 through switch 93*a* and the coil of a motor relay 103 to close the switch 103*a*. The switch 103*a* parallels the switch 93*a* of the ringer relay through the cam switch 85*a* to provide a holding circuit for the motor relay 103 after the ringing current stops and the ringer relay 93 drops out. By maintaining the relay switch 103*a* closed after the ringing current stops, power is maintained from the source 96 through the cam switch 85*a*, relay switch 103*a* and cam switch 86*a* lower contact to both the motor of the printing mechanism and the cam switch motor 102.

During the initial clockwise movement of the cam 86 by the motor 102 the switch 86*a* is shifted to its upper contact to maintain the power circuit from the source 96 to the motors 100*a* and 102, and shortly thereafter the cam switch 85*a* is opened to drop out the motor relay 103. The motors 100*a* and 102 are now maintained running through cam switch 86*a* upper contact until the cams 85–90 are driven through one complete revolution, at which time the switch 86*a* is opened at its upper contact and the motors are stopped.

Also, during the initial driving movement of the cams 85–90 the switch 90*a* is closed by the cam 90 to supply collector current from a 12 volt D.C. source 104 to an interrogate oscillator 105 and to connect the output of this oscillator via lead 106 and cam switch 87*a* lower contact through the primary of transformer 107 to ground 108. By the time the ringing current has stopped the secondary winding of the coupling transformer 107 is connected by the cam switch 88*a* upper contact across the telephone line $L_{11}L_{22}$ to feed the interrogate signal to the subscriber's station, the connection running from the top side of the secondary through lead 109, switch 94 and lead 95 to line $L_{22}$ and from the bottom side of the secondary through cam switch 88*a* upper contact and lead 92 to telephone line $L_{11}$. On receipt of the interrogate signal the subscriber's station is conditioned to continue through its cycle to feed a coded message back to the supervisor's station as before described. By the time the printing signals are received the cam switch 87*a* is shifted to its upper contact to complete connection of the left winding of the transformer 107, now operating as a secondary winding, to the input circuit of an amplifier 110 and the D.C. source 104. The printing signals from the substation are therefore first received and amplified by the amplifier 110.

Output of the amplifier 110 is connected to the coil of a relay 111. This relay has a switch 111*a* connected through the solenoid 100*b* of the printing mechanism 100 to a 24 volt source 112. The solenoid 100*b* is thus pulsed in the manner of the incoming printing signals. This operation of the solenoid in conjunction with the motor 100*a* causes a message to be printed in code form on a tape as by a standard printing mechanism which need not however be herein described in detail. At the end of the printing operation the printing mechanism opens a switch 94 to disconnect the printing mechanism from the telephone line $L_{11}L_{22}$. At the end of one complete revolution of the cams 85–90 made in 60 seconds, the cam switch 90*a* is opened to disconnect power from the oscillator and amplifier, and the cam switch 86*a* is returned to its lower contact to stop the motors 100*a* and 102. By disconnecting power from the printing mechanism the switch 94 is restored to its closed position to reconnect the supervisor's equipment to the telephone line $L_{11}L_{22}$. This restores the supervisor's station to its original condition for receiving another message from a subscriber's station.

As a signalling means at the supervisor's station for indicating whenever a message has been received from a substation, there is provided a signal lamp 113, relay 114 and reset switch 115. When the supervisor's station equipment is ready to receive a message from a substation, the cam 89 closes the switch 89*a* to complete a circuit from the power source 96 through lead line 116, cam switch 89*a* and lead line 117 through the signal lamp 113 and through the relay 114. Operation of the relay closes its switch 114*a* to complete a holding circuit for the relay through the reset switch 115. Also, through the reset switch 115 and the holding circuit switch 114*a* the signal lamp 113 continues to receive energizing current. Therefore, once a message is received by the supervisor's station the signal lamp will continue to be energized to indicate that fact until the reset switch 115 is momentarily pressed to drop out the relay 114.

In FIGURE 3 there is shown a more detailed layout of the mechanical apparatus for driving the timing cams at the substation 10. For example, as shown, the motor M has a permanent drive connection with the shaft 58. When the tail 57*a* of the one-way clutch spring 57 is freed by a notch 56*a* in the dialing disk 56 the spring grips the shaft and connects the same to the dialing cam 50 to operate the dial pulsing switch 50*a*. The motor M also has a permanent drive connection with the cams 27 and 28 to turn these cams through one complete revolution in a period of nine minutes. Further, the motor has a permanent drive connection through the step-up gear 30 with the cams 31, 32 and 33 to turn these cams through one complete revolution in a period of one and one half minutes. On the shaft 118 of this last set of cams is a sector gear 119 having gear teeth 120 only along a sector thereof. In the start position of the sector gear the gear teeth 120 stand about midway between a gear 121 on the shaft 122 of the dialing disk 56 and a gear 123 on the shaft 124 of the coding cams 21, 22 and 71. The sector gear is driven in a clockwise direction causing the teeth 120 to engage the pinion gear 121 first. As the gear teeth 120 move past the pinion gear 121—which requires an interval of about twenty seconds—the dialing disk 56 is turned through one revolution to complete the dialing by the substation of the supervisor's station. Later, as the gear teeth 120 pass the pinion gear 123—which again requires an interval of about twenty seconds—the coding cams 21, 22 and 71 are driven through one complete revolution to provide the coded message sent by the substation to the supervisor's station. When the sector gear is driven onward to its start position shown in FIGURE 3 the cam switches 27*a*–27*c* are returned by the cam 27 to stop the motor M and complete the cycle.

The embodiment of our invention herein particularly shown and described is intended to be illustrative and not limitative of our invention since the same is subject to changes and modifications without departure from the scope of our invention, which we endeavor to express according to the following claims.

We claim:

1. In a supervisory system including a substation to be monitored and a supervisor's station to be appraised when a predetermined condition occurs at said substation: the combination of a telephone line and switchboard apparatus for interconnecting said stations responsive to dial signals; telephone dialing means at said substation responsive to an occurrence of said predetermined condition for feeding dial signals to said telephone line to make a calling connection with said supervisor's station; means at said supervisor's station responsive to completion of a calling connection with said substation for feeding an interrogation signal to said substation; and means at said substation responsive to receipt of said interrogation signal from the supervisor's station for transmitting a coded message to the supervisor's station apprising of said predetermined condition.

2. The supervisory system set forth in claim 1 including repertory means at said substation operative upon each failure of the substation to receive said interrogation signal from the supervisor's station following a first calling attempt for dialing said supervisor's station again after a predetermined interval.

3. In a supervisory system including a substation to be monitored and a supervisor's station to be apprised when a predetermined condition occurs at said substation: the combination of a telephone line and switchboard apparatus for making connections between said stations; dialing means at said substation responsive to an occurrence of said predetermined condition for feeding dial signals to said telephone line to make a calling connection with said supervisor's station; means at said supervisor's station for feeding back an interrogation signal to said substation only when a calling connection is completed therewith; and timing means at said substation for rendering said substation effective to receive said interrogation signal following each calling attempt by said substation.

4. The supervisory system set forth in claim 3 including an oscillator for producing an output signal and means for coding the signal therefrom in predetermined relation to a condition to be monitored at the substation; and means for completing connection of said oscillator with said supervisor's station only on receipt beforehand of said interrogation signal from the supervisor's station.

5. In a supervisory system including a substation to be monitored and a supervisor's station to be apprised when a predetermined condition occurs at said substation: the combination of a telephone line and automatic switchboard apparatus for making connections between said stations; means at each station for feeding dialing signals into said telephone line; timing means at said substation activated whenever said predetermined condition occurs at the substation for feeding dialing signals into said line to make connection with said supervisor's station; means responsive to a connection being made with said supervisor's station for feeding an interrogation signal to the substation; means controlled by said timing means for rendering the substation operative to receive said interrogation signal following the dialing of the supervisor's station; an interrogation receiving means at the substation operable by the interrogation signal from the supervisor's station; means rendered operative by operation of said interrogation signal receiving means for transmitting a coded message into said telephone line to apprise of said predetermined condition at the substation; and means rendered operable by operation of said interrogation signal receiving means and controlled by said timing means for limiting said message transmitting means to a single operation for each occurrence of said predetermined condition at the substation.

6. In a supervisory system including a substation to be monitored and a supervisor's station to be apprised when a predetermined condition occurs at said substation: the combination of a telephone line and switchboard apparatus for making connections between said stations; dialing means at said substation responsive to an occurrence of said predetermined condition for calling said supervisor's station; means at said supervisor's station for feeding back an interrogation signal to the substation only when a calling connection is completed therewith; an interrogation relay at said substation operable by the interrogation signal received from the supervisor's station; a combination amplifier-oscillator at the substation; and means responsive to operation of said interrogation relay for connecting said combination amplifier-oscillator to operate as an oscillator and for connecting the output of the oscillator to the respective telephone line.

7. In a supervisory system including a substation to be monitored and a supervisor's station to be apprised when a predetermined condition occurs at said substation: the combination of a telephone line and switchboard apparatus for making connections between said stations; dialing means at said substation responsive to an occurrence of said predetermined condition for calling said supervisor's station; means at said supervisor's station for feeding back an interrogation signal to the substation only when a calling connection is completed therewith; an interrogation relay at said substation operable by the interrogation signal received from the supervisor's station; means responsive to operation of said interrogation relay for transmitting a coded message over the telephone line to said supervisor's station identifying the substation and apprising as to said predetermined condition; a single transmission relay operable to limit the message transmitting means to a single operation for each occurrence of said predetermined condition; an energizing circuit for said single transmission relay rendered operable by operation of said interrogation relay; timing means for completing said energizing circuit within a predetermined interval after the transmission of said coded message; a holding circuit for said single transmission relay rendered operative by operation of the relay; and reset means controlled by said timing means for dropping out both said interrogation relay and said single transmission relay.

8. The combination set forth in claim 7 wherein said timing means includes means for reactivating said dialing means a preset number of times within a first portion of each timing cycle unless a calling connection is completed, and means for holding said dialing means in an inactive condition during the remaining portion of each timing cycle.

9. In a supervisory system including a substation having equipment to be monitored as to the occurrence of a predetermined condition, and a supervisor's station to be apprised whenever such condition occurs: the combination of telephone lines and switchboard apparatus for making connections between said stations; detector means at the substation operated according to whether said predetermined condition exists or not; memory means at the substation activated by operation of said detector means; motor driven timing means activated by operation of said memory means and maintained in operation through a prescribed timing cycle upon each activation thereof; means controlled by said timing means for dialing said supervisor's station; means for returning an interrogation signal to said substation upon completion of a calling connection with said supervisor's station; means responsive to receipt of said interrogation signal for transmitting a message apprising of the occurrence of said predetermined condition; and means controlled by said detector and timing means for restoring said memory means upon the last of the followingf events to occur: (1) said timing cycle is completed, and (2) said detector means is restored.

10. The supervisory system set forth in claim 9 including means at said supervisor station for dialing said substation and completing a line connection therewith; and means responsive to completion of said line connection for activating said substation to report a message to the supervisor's station apprising as to whether said detector means are still operated or not.

11. The supervisory system set forth in claim 10 including signalling means at said supervisor's station activated upon receipt of a message from said substation; and manual reset means at said supervisor's station for restoring said signalling means.

12. The supervisory system set forth in claim 11 including a standard telephone handset at the supervisor's station for calling said substation; a source of ringing current included in said switchboard apparatus; means at said substation responsive to ringing current received over the telephone line for activating said timing means for operation through said timing cycle to cause in sequence: (1) the substation to dial the supervisor's station upon the supervisor having hung his handset, (2) the supervisor's station connection being made to feed an interrogate signal to the substation, and (3) the substation upon receipt of the interrogate signal to transmit a message to the supervisor's station apprising as to whether said predetermined condition has occurred and is still existing at the time the substation is called.

13. In a supervisory system including a substation with equipment to be monitored as to the occurrence of a predetermined condition, and a supervisory station to be apprised when such condition occurs: the combination of a telephone line with calling connection equipment between said stations; means at said substation and activated upon an occurrence of said predetermined condition for dialing said supervisor's station; means for transmitting a message as to said condition upon receipt of an interrogation signal from said supervisor's station following said dialing operation; and means responsive to a calling connection between said stations initiated at said supervisor's station for activating said message transmitting means to apprise said supervisor's station whether said condition still exists at the time said substation is called.

14. In a supervisory system including a substation to be monitored and a supervisor's station to be apprised when a predetermined condition occurs at said substation: the combination of a telephone line with calling connection equipment between said stations; detector means at said substation responsive to occurrence of said predetermined condition; dialing means at said substation; means for feeding an interrogation signal from said supervisor's station to said substation; means at said substation for transmitting a coded message to said supervisor's station to apprise of said predetermined condition at the substation; and repertory timing means at the substation operable through successive cycles and activated by said detector means for effecting within each cycle in the sequence here named: (1) connecting said substation to said telephone line, (2) activating said dialing means, (3) standing by for a predetermined interval for receipt of said interrogation signal, (4) redialing said supervisor's station within a predetermined interval following said first dialing if said interrogation signal is not received, (5) activating said message transmitting means upon receipt of said interrogation signal, and (6) resetting said equipment for reoperation at the end of the timing cycle upon a message having been transmitted within the cycle.

15. The supervisory system set forth in claim 14 including means for withholding said dialing means during a latter half of each timing cycle, and means for restarting the timing cycle upon the completion of each previous cycle and failure of the substation to make connection with and to transmit a message to the supervisor's station during the said previous cycle.

References Cited in the file of this patent

UNITED STATES PATENTS

| | | |
|---|---|---|
| 2,091,301 | Boswau | Aug. 31, 1937 |
| 2,148,044 | Boswau | Feb. 21, 1939 |
| 2,919,307 | Bachelet et al. | Dec. 29, 1959 |